United States Patent [19]

Chayamichi et al.

[11] Patent Number: 5,209,132
[45] Date of Patent: May 11, 1993

[54] SEMICONDUCTOR HANDLING DEVICE HAVING A SELF-CHECK FUNCTION AND METHOD OF SELF-CHECKING A SEMICONDUCTOR HANDLING DEVICE

[75] Inventors: Yuzo Chayamichi; Kenji Abe, both of Kitakyushu, Japan

[73] Assignee: Kabushiki Kaisha Toshiba, Kawasaki, Japan

[21] Appl. No.: 658,751

[22] Filed: Feb. 21, 1991

[30] Foreign Application Priority Data

Feb. 23, 1990 [JP] Japan ................................. 2-42886

[51] Int. Cl.$^5$ ..................... G01M 19/00; G01D 18/00; B65H 43/04
[52] U.S. Cl. ..................... 73/865.9; 73/1 R; 414/222; 414/DIG. 1
[58] Field of Search ..................... 73/865.9, 1 R, 1 J; 356/243; 414/222, DIG. 1

[56] References Cited

U.S. PATENT DOCUMENTS

| | | | |
|---|---|---|---|
| 3,671,716 | 6/1972 | Slutsky | 382/56 X |
| 4,045,996 | 9/1977 | Sopcak et al. | 73/1 R |
| 4,253,766 | 3/1981 | Funk | 356/418 |
| 4,285,745 | 8/1981 | Farabaugh | 73/1 J |
| 4,331,026 | 5/1982 | Howard et al. | 73/1 R |
| 4,426,179 | 1/1984 | Jefferson | 73/865.9 |
| 4,429,464 | 2/1984 | Burrus | 73/1 J |
| 4,624,564 | 11/1986 | Dahlgren | 356/243 |
| 4,996,658 | 2/1991 | Baker | 324/671 |
| 5,058,443 | 10/1991 | Reidmair | 73/865.9 |

*Primary Examiner*—Tom Noland
*Attorney, Agent, or Firm*—Finnegan, Henderson, Farabow, Garrett & Dunner

[57] ABSTRACT

A semiconductor handling device having a self-check mechanism comprising a product placement area in which a plurality of products are placed, a standard sample holding area for holding a standard sample, a tester for testing a product or the standard sample, and checking the characteristic thereof, a transfer robot for transferring the product or the standard sample between the product area or the standard sample holding area and the tester, and controller for causing the tester to test the standard sample when a testing operation starts or when the tester continuously determines that products are articles of inferior quality.

2 Claims, 5 Drawing Sheets

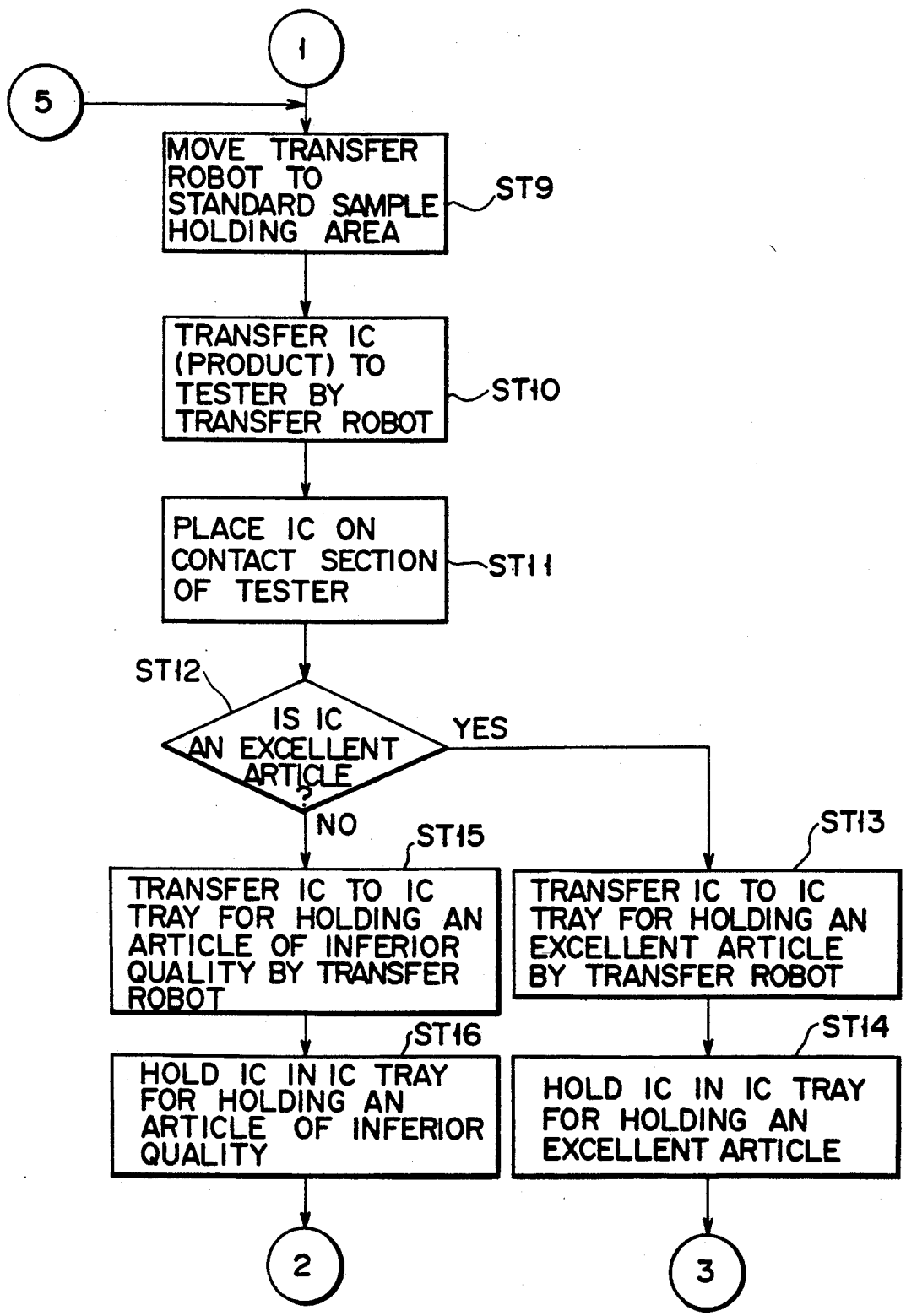
F I G. 3B

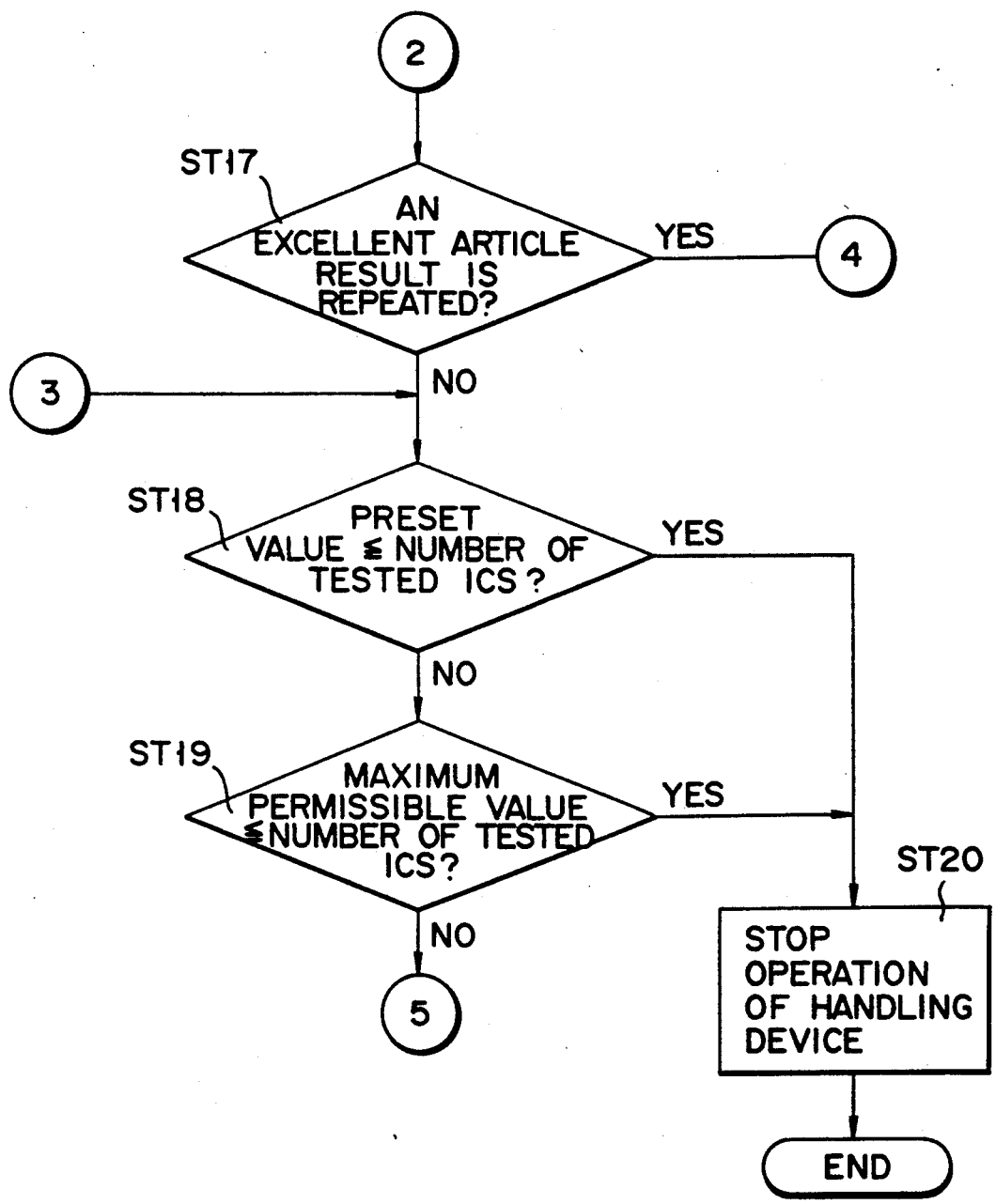
F I G. 3C

SEMICONDUCTOR HANDLING DEVICE HAVING A SELF-CHECK FUNCTION AND METHOD OF SELF-CHECKING A SEMICONDUCTOR HANDLING DEVICE

BACKGROUND OF THE INVENTION

1. Field of the Invention

This invention relates to the improvement of a semiconductor handling device.

2. Description of the Related Art

Development in the technique of processing semiconductor devices has in recent years greatly contributed to increases in their manufacturing yield.

However, in checking the characteristic of a product (IC) by means of a tester, a non-defective product may be automatically determined as being a defective product due to a malfunction in the handling device caused by misplacement of the IC with respect to the socket, a tester malfunction, misoperation by the operator, or the like. This hinders improvement of the product yield, which in turn results in an inability to reduce manufacturing costs.

SUMMARY OF THE INVENTION

The present invention has been made to overcome the above-described drawback of the conventional art. It is accordingly an object of the present invention to prevent erroneous assessments of products due to a malfunction in a semiconductor handling device or tester, thus increasing the yield of the products and lowering the manufacturing cost.

To achieve this object, the semiconductor handling device of the invention has a self-check mechanism comprising a product placement area in which a plurality of products are placed, a standard sample holding area for holding a standard sample, tester means for testing a product or the standard sample and checking the characteristic thereof, transfer means for transferring the product or the standard sample between the product area or the standard sample holding area and the tester means, and control means for causing the tester means to test the standard sample when a testing operation starts or when said tester means continuously determines that products are an article of inferior quality.

According to the self-checking method of the present invention, a standard sample is placed in advance in a semiconductor handling device, and a tester means test the standard sample when a testing operation starts or when products are continuously determined an article of inferior quality, thereby checking whether the semiconductor handling device is operating normally or not.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3A to 3C are flow charts showing an operation of a semiconductor handling device according to the present invention.

DETAILED DESCRIPTION OF THE PREFERRED EMBODIMENTS

An embodiment of the present invention will now be described with reference to the accompanying drawings.

Figure 1:
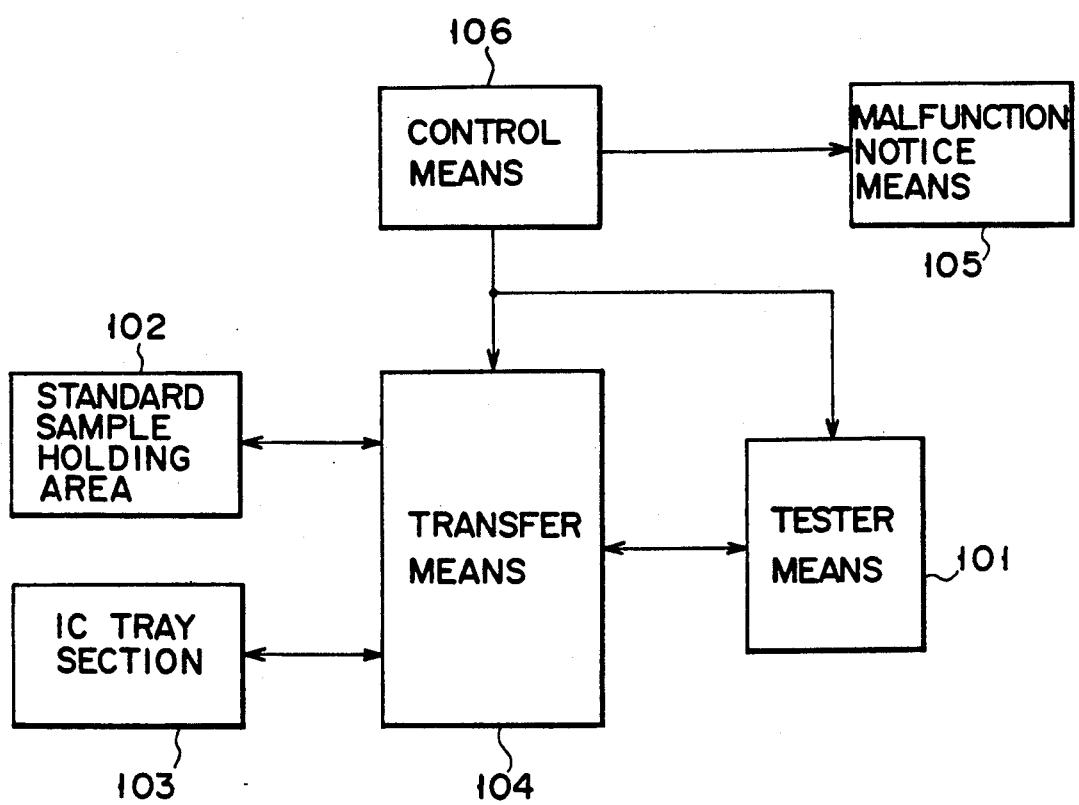
FIG. 1 is a block diagram showing the basic structure of a semiconductor handling device according to an embodiment of the present invention.

FIG. 1 shows a semiconductor handling device according to an embodiment of the present invention. The semiconductor handling device comprises an tester means 101, a standard sample holding area 102, an IC tray section (product placement area) 103, an transfer means 104, a malfunction notice means 105, and a control means 106.

The tester means (e.g., a tester) 101 tests a product (IC) or a standard sample (a standardized product), and checks the characteristic thereof. The standard sample holding area 102 holds the standard sample. The IC tray section 103 includes an IC tray for holding products to be measured, an IC tray for holding an excellent article, and an IC tray for holding an article of inferior quality, all of which are arranged in predetermined portions of the IC tray section 103. The IC transfer means (e.g., an IC transfer robot) 104 transfers the standard sample between the standard sample holding area 102 and the tester means 101. The transfer means 104 also transfers products between the IC tray section 103 and the tester means 101. The control means 106 controls the tester means 101, the transfer means 104, and the malfunction notice means (e.g., a signal tower, a buzzer, or the like) 105.

Figure 2:
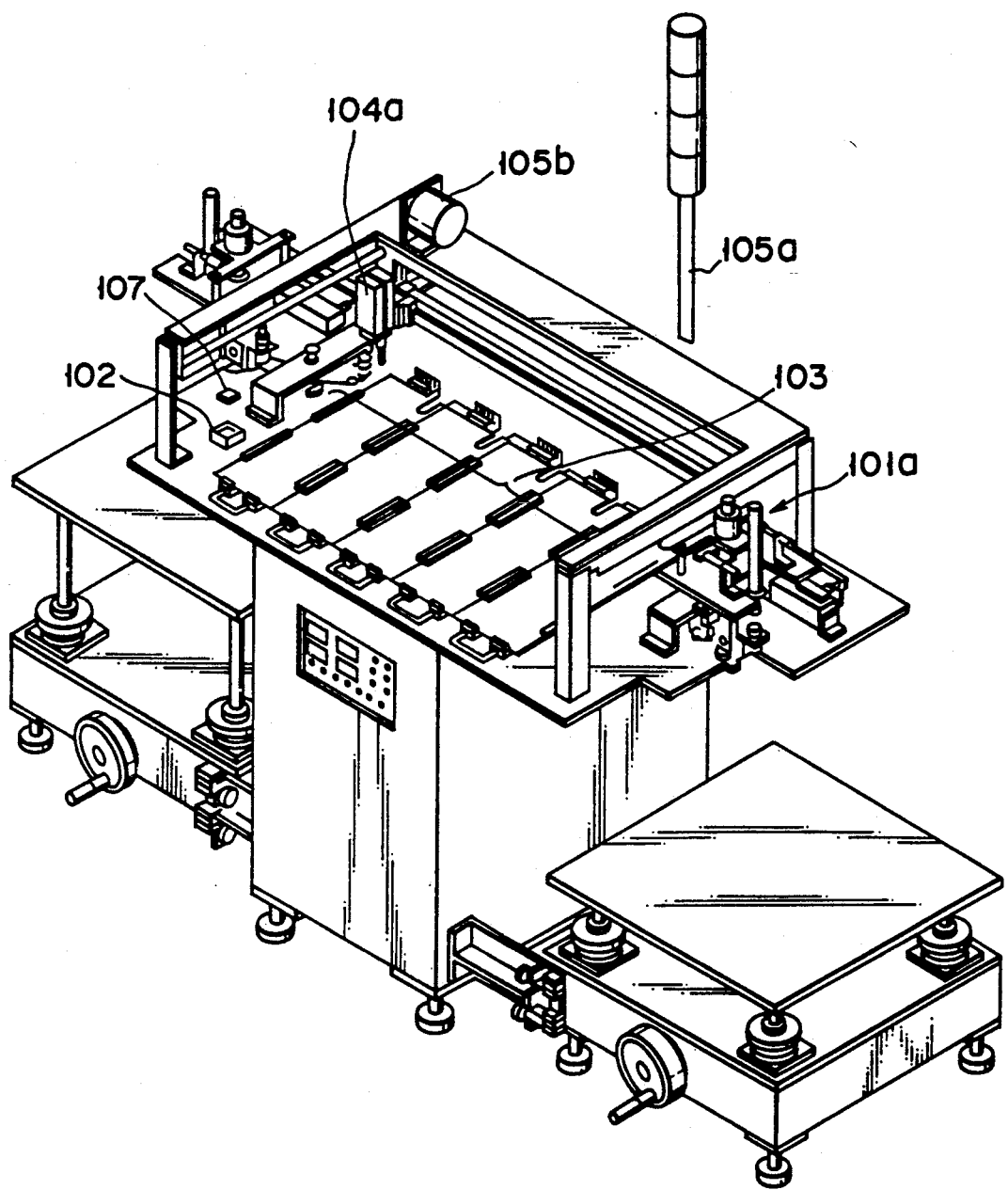
FIG. 2 is a perspective view showing details of the semiconductor handling device shown in FIG. 1.

FIG. 2 shows details of the above-mentioned semiconductor handling device. A reference numeral 101a denotes a tester, 102 a standard sample holding area, 103 an IC tray section, 104a an transfer robot, 105a a signal tower, 105b buzzer, and 107 a standard sample.

The semiconductor handling device operates basically as follows. When a testing operation starts or when the tester 101a continuously determined that products are an article of inferior quality, the transfer robot 104a transfers the standard sample 107 from the standard sample holding area 102 to the tester 101a, which tests the standard sample. When the standard sample is determined an excellent article, the device determines that the IC robot 104a and the tester 101a are operating normally, whereas when the standard sample is determined an article of inferior quality, the device determines that these elements are malfunctioning. If the IC robot 104a and the tester 101a are determined as malfunctioning, the control means (not shown) supplies a signal to the signal tower 105a and the buzzer 105b. As a result, the light in the signal tower 105a flashes and the buzzer 105b sounds, thereby informing the operator of the malfunction.

As described above, the semiconductor handling device comprises the standard sample holding area 102 on which the standard sample 107 is placed. When a testing operation starts and when products are continuously determined an article of inferior quality, the tester 101a tests the standard sample 107, and checks the characteristic thereof. As a result, whether the semiconductor handling device operates normally or not can be checked. Thus, the semiconductor handling device has a self-check function. By virtue of this function, since the semiconductor handling device operates steadily, the manufacturing yield of the products can be increased, thereby lowering the manufacturing cost.

Figure 3A:
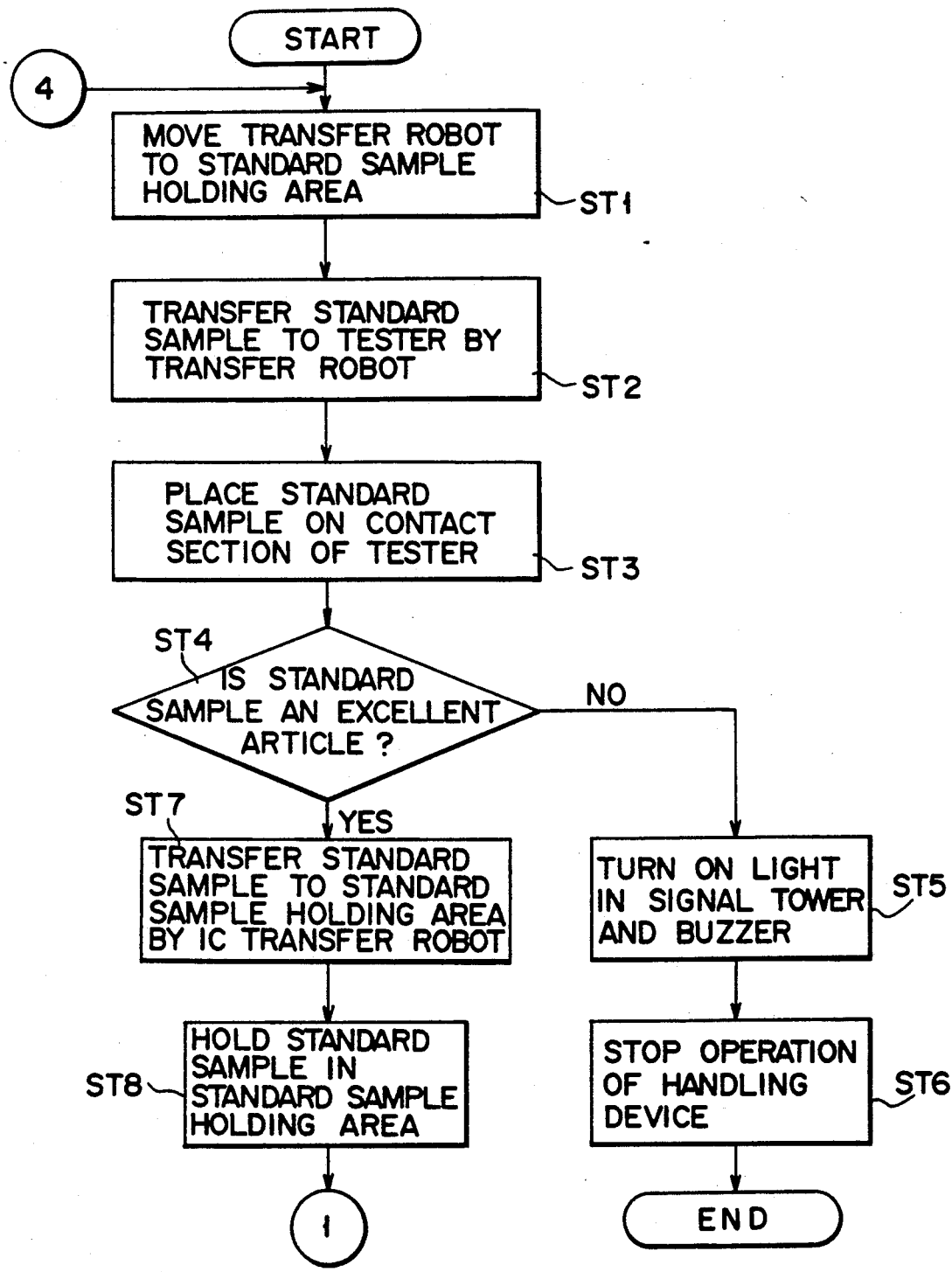

FIGS. 3A to 3C are flow charts showing an operation of the semiconductor handling device having the self-check function as described above. The operation of the device and the self-checking method will now be described with reference to FIG. 2 and FIGS. 3A to 3C.

An operator places an IC tray for holding products (IC) to be measured, a IC tray for holding an excellent article, and a IC tray for holding an article of inferior quality on predetermined portions of the IC tray section 103, and turns on the power switch of the semiconductor handling device.

Then, to detect a possible malfunction in the handling device, caused by misplacement of the IC with respect to the socket, a possible malfunction in the tester, possible misoperation by the operator, and the like, the following operation is performed. The IC transfer robot 104a is moved to the standard sample holding area 102, transfers the standard sample 107 from the area 102 to the tester 101a, and places the standard sample 107 on a contact section of the tester 101a (steps ST1 to ST3). The tester 101a checks the characteristic of the standard sample 107 on the contact section. If the standard sample 107 is determined an article of inferior quality, the control means 106 determines that the IC robot 104a or the tester 101a is malfunctioning, and supplies a signal to the signal tower 105a and buzzer 105b. The light in the signal tower 105 flashes and the buzzer 105 sounds upon reception of the signal, thereby informing the operator that the semiconductor handling device is malfunctioning. Thereafter, the semiconductor handling device stops operating (steps ST4 to ST6). In contrast, if the standard sample 107 is determined an excellent article, the control means 106 determines that the IC transfer robot 104a and the tester 101a are operating normally. Then, the standard sample 107 is transferred by the IC transfer robot 104a to the standard sample holding area 102, and held therein (steps ST7 and ST8).

Subsequently, the IC robot 104a is moved to the IC tray holding products to be tested. The IC robot 104a transfers one of the products to the tester 101a, and places it on the contact section (steps ST9 to ST11). The tester 101a tests the characteristic of the product placed on the contact section.

If the product is determined an excellent article, it is transferred to the IC tray for holding an excellent article by the IC transfer robot 104a, and held thereon (steps ST12 to 14). Then, the control circuit 106 determines whether the number of tested products reaches a preset value, or whether the number reaches a maximum permissible value. If the number of measured products reaches the preset value or the maximum permissible value, the control circuit stops the operation of the semiconductor handling device. If the number reaches neither the preset value nor the maximum permissible value, the IC transfer robot 104a is moved above the IC tray holding the products to be tested, and repeats the testing operation until the number of tested products reaches the preset value or the maximum permissible value (steps ST18 to ST20).

On the other hand, if the product is determined to be defective as a result of the testing operation, it is transferred to the defective IC tray by the IC transfer robot 104a and held thereon (steps ST15 and ST16). Then, the control circuit 106 determines whether "an article of inferior quality" result is repeatedly determined a preset number of times. If the "an article of inferior quality" result is repeated the preset number of times, the IC transfer robot 104a is moved to the standard sample holding area 102, and transfers the standard sample 107 to the tester 101a (step ST17). If the "an article of inferior quality" result is not repeated the preset number of times, the control circuit 106 determines whether the number of tested products reaches the preset value, or whether the number reaches the maximum permissible value. If the number of tested products reaches the preset value or the maximum permissible value, the operation of the semiconductor handling device stops. If the number reaches neither the preset value nor the maximum permissible value, the IC transfer robot 104a is moved to the IC tray holding the products to be measured, and repeats the testing operation until the number of tested products reaches the preset value or the maximum permissible value (steps ST18 to ST20).

According to the above-described operation of the semiconductor handling device having a self-check function and the self-checking method, a standardized product (a standard sample) is tested when a product testing operation starts and when products are continuously determined an article of inferior quality. Thus, a self-check operation can be automatically performed while the semiconductor handling device is continuously operating. As a result, reduction of the manufacturing yield due to a malfunction in the semiconductor handling device or the tester can be prevented, thereby lowering the manufacturing cost of the products.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A handling device having a self-check mechanism, the handling device being adapted for determining whether a product is good or bad according to predetermined criteria, comprising:
   a first area for holding a plurality of products;
   a second area for holding a standard sample;
   tester means for testing a product;
   transfer means for transferring the product between the first area and the tester means, and for transferring the standard sample between the second area and the tester means; and
   means for causing the tester means to test the standard sample when a testing operation starts and when said tester means continuously determines that a predetermined number of products are of bad quality, and for disabling testing operations of said tester means when said tester means determines that said standard sample is of bad quality.

2. The device of claim 1, wherein the tester means includes means for testing a semiconductor device.

* * * * *